(12) United States Patent
Lafond et al.

(10) Patent No.: US 12,523,142 B2
(45) Date of Patent: Jan. 13, 2026

(54) MACHINE LEARNING APPROACHES TO DETECTING PRESSURE ANOMALIES

(71) Applicant: Schlumberger Technology Corporation, Sugar Land, TX (US)

(72) Inventors: Aurore Lafond, Cambridge (GB); Maurice Ringer, London (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 862 days.

(21) Appl. No.: 17/754,582

(22) PCT Filed: Oct. 5, 2020

(86) PCT No.: PCT/US2020/070615
§ 371 (c)(1),
(2) Date: Apr. 6, 2022

(87) PCT Pub. No.: WO2021/072420
PCT Pub. Date: Apr. 15, 2021

(65) Prior Publication Data
US 2023/0281473 A1    Sep. 7, 2023

Related U.S. Application Data

(60) Provisional application No. 62/911,341, filed on Oct. 6, 2019.

(51) Int. Cl.
*E21B 21/08* (2006.01)
*E21B 47/06* (2012.01)
*G06N 3/042* (2023.01)

(52) U.S. Cl.
CPC ............. *E21B 47/06* (2013.01); *E21B 21/08* (2013.01); *E21B 2200/22* (2020.05); *G06N 3/042* (2023.01)

(58) Field of Classification Search
CPC ...... E21B 21/08; E21B 47/06; E21B 2200/22; G06N 3/042; G06N 3/045; G06N 3/09; G06N 20/10
See application file for complete search history.

(56) References Cited

U.S. PATENT DOCUMENTS 2,966,059 A    12/1960    Dower
6,234,250 B1   5/2001     Green et al.
(Continued)

FOREIGN PATENT DOCUMENTS

CN    102782252 A    11/2012
CN    103184841 A    7/2013
(Continued)

OTHER PUBLICATIONS

Noshi, C. & Schubert, J. "The Role of Machine Learning in Drilling Operations; A Review" Society of Petroleum Engineers, SPE-191823-18ERM-MS (2018) (Year: 2018).*
(Continued)

*Primary Examiner* — Jay Hann
(74) *Attorney, Agent, or Firm* — Jeffrey D. Frantz (57) ABSTRACT

Methods, computing systems, and computer-readable media for training and using a machine learning system to predict equipment pressure measurements, of which the method includes inputting a set of training data including a first set of equipment pressure measurements, inputting a set of supplemental data. The supplemental data is obtained from a physical model that estimates a second set of equipment pressure measurements. The method includes training the machine learning system based on the set of training data and the set of supplemental data to generate a trained machine learning system, receiving real-time operational data, inputting the real-time operational data into the trained machine learning system, predicting a real-time equipment pressure measurement based on the inputting the real-time
(Continued)

operational data into the trained machine learning system, and executing a computer-based instruction based on the predicting the real-time equipment pressure measurement.

17 Claims, 8 Drawing Sheets

(56) References Cited

U.S. PATENT DOCUMENTS

| | | | |
|---|---|---|---|
| 10,208,548 B2 | 2/2019 | Francois | |
| 10,294,742 B2 * | 5/2019 | Lovorn | E21B 21/08 |
| 10,502,009 B2 | 12/2019 | Sehsah | |
| 10,683,744 B2 | 6/2020 | Torrione | |
| 10,915,829 B1 | 2/2021 | Wani | |
| 11,441,404 B2 * | 9/2022 | Madasu | E21B 47/06 |
| 11,448,057 B2 | 9/2022 | Samuel | |
| 11,467,314 B2 * | 10/2022 | Chen | G01V 20/00 |
| 2003/0139916 A1 | 7/2003 | Choe | |
| 2008/0264691 A1 | 10/2008 | Allen | |
| 2011/0220410 A1 | 9/2011 | Aldred et al. | |
| 2012/0292110 A1 | 11/2012 | Downton | |
| 2013/0325351 A1 | 12/2013 | Haberer et al. | |
| 2014/0110167 A1 | 4/2014 | Goebel et al. | |
| 2015/0300151 A1 | 10/2015 | Mohaghegh | |
| 2016/0191163 A1 | 6/2016 | Preston et al. | |
| 2016/0237810 A1 | 8/2016 | Beaman, Jr. | |
| 2016/0266276 A1 | 9/2016 | Stokely | |
| 2016/0369621 A1 | 12/2016 | Salminen et al. | |
| 2017/0175467 A1 | 6/2017 | Francois | |
| 2017/0191359 A1 | 7/2017 | Dursun et al. | |
| 2017/0292513 A1 | 10/2017 | Haddad et al. | |
| 2017/0314382 A1 | 11/2017 | Torrione | |
| 2018/0232198 A1 | 8/2018 | Lang | |
| 2018/0247156 A1 | 8/2018 | Holtham et al. | |
| 2019/0005908 A1 | 1/2019 | Chen | |
| 2019/0017352 A1 | 1/2019 | Chugunov et al. | |
| 2019/0114352 A1 | 4/2019 | Sung | |
| 2019/0188192 A1 | 6/2019 | Hayes et al. | |
| 2019/0345809 A1 | 11/2019 | Jain et al. | |
| 2020/0080410 A1 | 3/2020 | Kjosmoen | |
| 2020/0285216 A1 | 9/2020 | Elyas et al. | |
| 2020/0332627 A1 | 10/2020 | Tang et al. | |
| 2020/0347700 A1 | 11/2020 | Yu | |
| 2021/0248500 A1 | 8/2021 | Amur Varadarajan et al. | |

FOREIGN PATENT DOCUMENTS

| | | |
|---|---|---|
| CN | 204299513 U | 4/2015 |
| CN | 105952436 A | 9/2016 |
| CN | 109508827 A | 3/2019 |
| GB | 2564507 A | 1/2019 |
| KR | 1020190095442 | 8/2019 |
| WO | 2015073017 A1 | 5/2015 |
| WO | 2016205469 A1 | 12/2016 |
| WO | 2019099693 A1 | 5/2019 |
| WO | 2019216891 A1 | 11/2019 |
| WO | 2021087509 A1 | 5/2021 |
| WO | 2022155681 A1 | 7/2022 |
| WO | 2022165495 A1 | 8/2022 |

OTHER PUBLICATIONS

Akinsete, O. & Adesiji, B.A. "Bottom-Hole Pressure Estimation from Wellhead Data Using Artificial Neural Network" Society of Petroleum Engineers, SPE-198762-MS (Aug. 2019) (Year: 2019).*

Fjetland, A., K. et al., "Kick Detection and Influx Size Estimation during Offshore Drilling Operations using Deep Learning", 14th IEEE Conference on Industrial Electronics and Applications, 2019, 6 pages.

Johnson, J. M. et al., "Survey on deep learning with class imbalance", Journal of Big Data, 2019, 6(27), 54 pages.

Betancourt, M., "The QR Decomposition for Regression Models", retrieved from the Interent at: URL:https://mc-stan.org/users/documentation/case-studies/qr_regression.html, retrieved on Nov. 6, 2024, 17 pages.

Chowdhury, D. et al., "Prediction of Standpipe Pressure Using Real Time Data", Proceedings of the International Conference on Mechanical Engineering, ICME09-FM-02, 2009, 6 pages.

Youcefi, M. R. et al., "New model for standpipe pressure prediction while drilling using Group Method of Data Handling", Petroleum, 2022, 8, pp. 210-218.

Extended Search Report issued in European Patent Application No. 22746906.1 dated Nov. 8, 2024, 14 pages.

Extended Search Report issued in European Patent Application No. 22740266.6 dated Nov. 22, 2024, 12 pages.

Extended Search Report issued in European Patent Application No. 20873785.8 dated Oct. 12, 2023, 6 pages.

Extended Search Report issued in European Patent Application No. 20883020.8 dated Nov. 6, 2023, 6 pages.

McCann, D. et al., "Computerized flow monitors detect small kicks", Oil & Gas Journal, 1992, 8, 4 pages.

Al-Hameedi_Using Machine Learning to Predict Lost Circulation in the Rumaila Field_SPE-191933-MS_2018_16_pages.

Al-Hameedi_Predictive Data Mining Techniques for Mud Losses Mitigation_SPE-192182-MS_2018_19_pages.

Alkinani_Prediction of Lost Circulation Prior to Drilling for Induced Fractures Formations_SPE-195197-MS_2019_9_pages.

Jarad, Niemi, Bayesian Linear Regression [online], Apr. 23, 2019 [retrieved on Apr. 14, 2021]. Retrieved from the Internet: <URL: https://www.jarad.me/courses/stat544/slides/Ch14/Ch14a.pdf>, pp. 1, 21.

Search Report and Written Opinion of International Patent Application No. PCT/US2020/070615 dated Feb. 2, 2021, 10 pages.

Search Report and Written Opinion of International Patent Application No. PCT/US2020/070700 dated Oct. 27, 2020, 12 pages.

Search Report and Written Opinion of International Patent Application No. PCT/US2022/070371 dated May 10, 2022, 9 pages.

International Preliminary Report on Patentability of International Patent Application No. PCT/US2022/070213 dated May 3, 2022, 9 pages.

* cited by examiner

MACHINE LEARNING APPROACHES TO DETECTING PRESSURE ANOMALIES

CROSS-REFERENCE TO RELATED APPLICATIONS

This application is a National Stage Entry of International Patent Application No. PCT/US2020/070615, filed Oct. 5, 2020, which claims priority to U.S. Provisional Patent Application 62/911,341, which was filed on Oct. 6, 2019, and is incorporated herein by reference in its entirety.

BACKGROUND

Accurate detection of pressure abnormalities in equipment (e.g., drilling equipment) when performing oilfield services, such as drilling a well, may avert detrimental incidents, such as kicks, stuck pipe, drillstring washouts, etc.

Machine learning (ML) is the study of computer algorithms that improve automatically through experience. Machine learning algorithms build a mathematical model based on sample data, known as "training data", in order to make predictions or decisions without being explicitly programmed to do so. Supervised learning is one example ML approach in which the computer is presented with example inputs and their desired outputs, given by a "teacher", and the goal is to learn a general rule that maps inputs to outputs. Supervised ML may involve training a machine learning system (e.g., a neural network, Gaussian process, etc.) based on training data points in which a training data point includes a set of data and a "truth" that describes a representation of the set of data. Training the machine learning system may involve inputting potentially thousands or even millions of training data points into a training system. Once a machine learning system is considered to be trained, the machine learning system may be used to identify or predict a representation of an input set of data.

Unsupervised learning is another example ML approach in which no labels are given to the learning algorithm, leaving it on its own to find structure in its input. Unsupervised learning can be a goal in of itself (e.g., discovering hidden patterns in data) or a means towards an end (feature learning).

SUMMARY

Embodiments of the disclosure may provide a method for training and using a machine learning system to predict equipment pressure measurements. The method includes inputting, into a machine learning system training operation, a set of training data including a first set of equipment pressure measurements, inputting, into the machine learning system training operation, a set of supplemental data. The supplemental data is obtained from a physical model that estimates a second set of equipment pressure measurements. The method also includes training the machine learning system based on the inputting the set of training data and the set of supplemental data to generate a trained machine learning system, receiving real-time operational data, inputting the real-time operational data into the trained machine learning system, predicting a real-time equipment pressure measurement based on the inputting the real-time operational data into the trained machine learning system, and executing a computer-based instruction based on the predicting the real-time equipment pressure measurement.

Embodiments of the disclosure may also provide a computing system, including one or more processors, and a memory system including one or more non-transitory computer-readable media storing instructions that, when executed by at least one of the one or more processors, cause the computing system to perform operations. The operations may include inputting a set of training data including a first set of equipment pressure measurements, and inputting a set of supplemental data. The supplemental data is obtained from a physical model that estimates a second set of equipment pressure measurements. The operations also include training the machine learning system based on the set of training data and the set of supplemental data to generate a trained machine learning system, receiving real-time operational data, inputting the real-time operational data into the trained machine learning system, predicting a real-time equipment pressure measurement based on the inputting the real-time operational data into the trained machine learning system, and executing a computer-based instruction based on the predicting the real-time equipment pressure measurement.

Embodiments of the disclosure may further provide a non-transitory computer-readable medium storing instructions that, when executed by one or more processors of a computing system, cause the computing system to perform operations. The operations may include inputting a set of training data including a first set of equipment pressure measurements, and inputting a set of supplemental data. The supplemental data is obtained from a physical model that estimates a second set of equipment pressure measurements. The operations also include training the machine learning system based on the set of training data and the set of supplemental data to generate a trained machine learning system, receiving real-time operational data, inputting the real-time operational data into the trained machine learning system, predicting a real-time equipment pressure measurement based on the inputting the real-time operational data into the trained machine learning system, and executing a computer-based instruction based on the predicting the real-time equipment pressure measurement.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Accurate detection of pressure abnormalities in equipment (e.g., drilling equipment) when performing oilfield services, such as drilling a well, may avert detrimental incidents, such as kicks, stuck pipe, drillstring washouts, etc. Monitoring systems to detect and respond to pressure anomalies can be expensive, unreliable, and inconsistent. Further, existing approaches may be prone to error, resulting in results that are not sufficiently accurate and reliable (e.g., producing false alarms). For example, pressure measurements may be time-consuming and computer resource intensive to calculate from input sensor data, and may also be inaccurate.

Machine learning (ML) may be applied to predict pressure abnormalities. For example, ML may involve training a machine learning system (e.g., a neural network, a Gaussian process, and/or other type of machine learning system) based on training data points in which a training data point includes a set of data and a "truth" that describes a representation of the set of data (e.g., a pressure measurement). Training the machine learning systems may involve constructing a prediction model. That is, a trained machine learning system may implement the prediction model that may be used to predict pressure measurements based on a set of inputs without the time-consuming and computer resource intensive processes to calculate pressure measurements from input data. However, training the machine learning system may involve inputting potentially thousands or even millions of training data points into a machine learning system training system. For some applications, training data may be relatively easy to obtain and produce. However, in some situations, it may not be practical or feasible to obtain a full or complete set of training data points to train a machine learning system. For example, in the context of determining pump pressure for oil and gas equipment, a reliable and robust machine learning system may require an inordinate number of training data points, which would require time-consuming and expensive experimentation to obtain. In such a situation, obtaining a sufficient quantity of training data points may be impractical, unfeasible, and/or cost prohibitive.

Accordingly, aspects of the present disclosure may include a system and/or method that trains a machine learning system based on hybrid approach that uses a limited set of training data in a situation in which acquiring a rich set and full set of training data (e.g., potentially thousands or more training data points) may be unfeasible, time consuming, expensive, impractical or impossible. For example, the systems and/or methods, described herein, may train the machine learning system using a hybrid approach that uses a limited set of training data and supplemental data from a physical model as inputs to Gaussian training process. That is, the physical model may produce estimates of truths that may supplement the training data. In this way, a machine learning system may be trained with a limited set of training data, reducing the level of time and effort in training the machine learning system. For example, using the techniques described herein, obtaining an extensive and full set of training data (e.g., from experimentation, historical field measurements over an extensive period of time, etc.) is no longer needed for training a machine learning system. In other words, the supplemental data may not need to be historical or experimental data. Such techniques may be particularly useful in certain fields, such as oil and gas related fields in which obtaining training data relating to pump pressure may be time consuming and/or expensive to obtain. Also, by training the machine learning system with the limited set of training data and with outputs from a physical model, it is possible to start using and refining the trained machine learning system significantly sooner than if the machine learning system were trained with a more rich an full set of training data.

As an illustrative, non-limiting example in the context of determining pump pressure for oil and gas equipment, aspects of the present disclosure may train a machine learning system with a limited set of training data in which each training data point may include a calibration point identifying a truth pump pressure based on a set of inputs (e.g., bit depth, flow rate, flow pressure, surface torque, weight on bit, etc.). Instead of obtaining a vast number of calibration points (e.g., thousands of calibration points) for different pump pressures to train a machine learning system, (which may be impractical, unfeasible, and time consuming), aspects of the present disclosure may initially train the machine learning system based on a significantly fewer number of points (e.g., three or four points). Additional training data points may be estimated from a physical model that produces estimated pump pressures based on a set of input data.

Based on the calibration points and the supplemental training data points estimated by the physical model, the machine learning system may be initially trained fairly quickly, and used to estimate pump pressures in real time based on input measurements. Over a period of time, the machine learning system may be updated using real-time measurements of pump pressure based on real-time measurements of input factors associated with the pump pressure measurements (e.g., bit depth, flow rate, flow pressure, surface torque, weight on bit, etc.). Thus, aspects of the present disclosure may produce a trained machine learning system model that is trained using a hybrid approach of a limited set of training data and estimates from a physical model. In some embodiments, different machine learning system models may be trained for different types or phases of a drilling operation (e.g., different models may be trained for on-bottom and off-bottom operations). As further described herein, the systems and/or methods may be fully automatic or semi-automatic in which little to no human intervention is needed to train and update the machine learning system. Additionally, or alternatively, the trained machine learning system may provide uncertainty margins associated with pressure measurement predictions.

In some embodiments, pressure measurement predictions may be outputted for display (e.g., a graph, a chart, etc.) for visual presentation. Additionally, or alternatively, abnormal or anomalous pressure measurement predictions may trigger an alert to notify a user (e.g., equipment operator) that an anomalous pressure measurement has been detected (e.g., such that the equipment operator may take appropriate corrective action). In some embodiments, the pressure measurement predictions may be used to refine the machine learning system but abnormal or anomalous pressure measurement predictions may be excluded from refining the machine learning system (e.g., to prevent the abnormal or anomalous pressure measurement predictions from adversely skewing the machine learning system training).

In some embodiments, the systems and/or methods, described herein, may implement automatic recalibration or automatic refinement of the machine learning system in which pressure measurements may be used to refine the prediction accuracy of the machine learning system. As described herein, the machine learning system may output use uncertainty prediction to determine whether a pressure measurement may be used as a recalibration point, so as to avoid skewing the machine learning prediction model. For example, if a pressure measurement is anomalous (e.g., outside of thresholds corresponding to the uncertainty prediction), the anomalous pressure measurement may not be used for refining the machine learning prediction model (although the anomalous pressure measurement may be outputted to alert an operator to further investigate the anomalous pressure measurement and/or take corrective action).

While aspects of the present disclosure are described in terms of training a machine learning system to predict pressure measurements in oil and gas equipment, it will be appreciated that the systems and/or methods, described herein are not so limited. More specifically, a hybrid machine learning approach may train a machine learning system to predict any variety of outputs based on a given set of inputs. For example, the hybrid machine learning approach, described herein, may train a machine learning system to predict any variety of equipment analytics measurements other than pressure measurements. Additionally, or alternatively, the hybrid machine learning approach may train a machine learning system to predict measurements for equipment analytics for other types of equipment outside of the oil and gas domain. Additionally, or alternatively, the hybrid machine learning approach may train a machine learning system to predict any other variety of outputs unrelated to equipment analytics and/or or pressure measurements.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
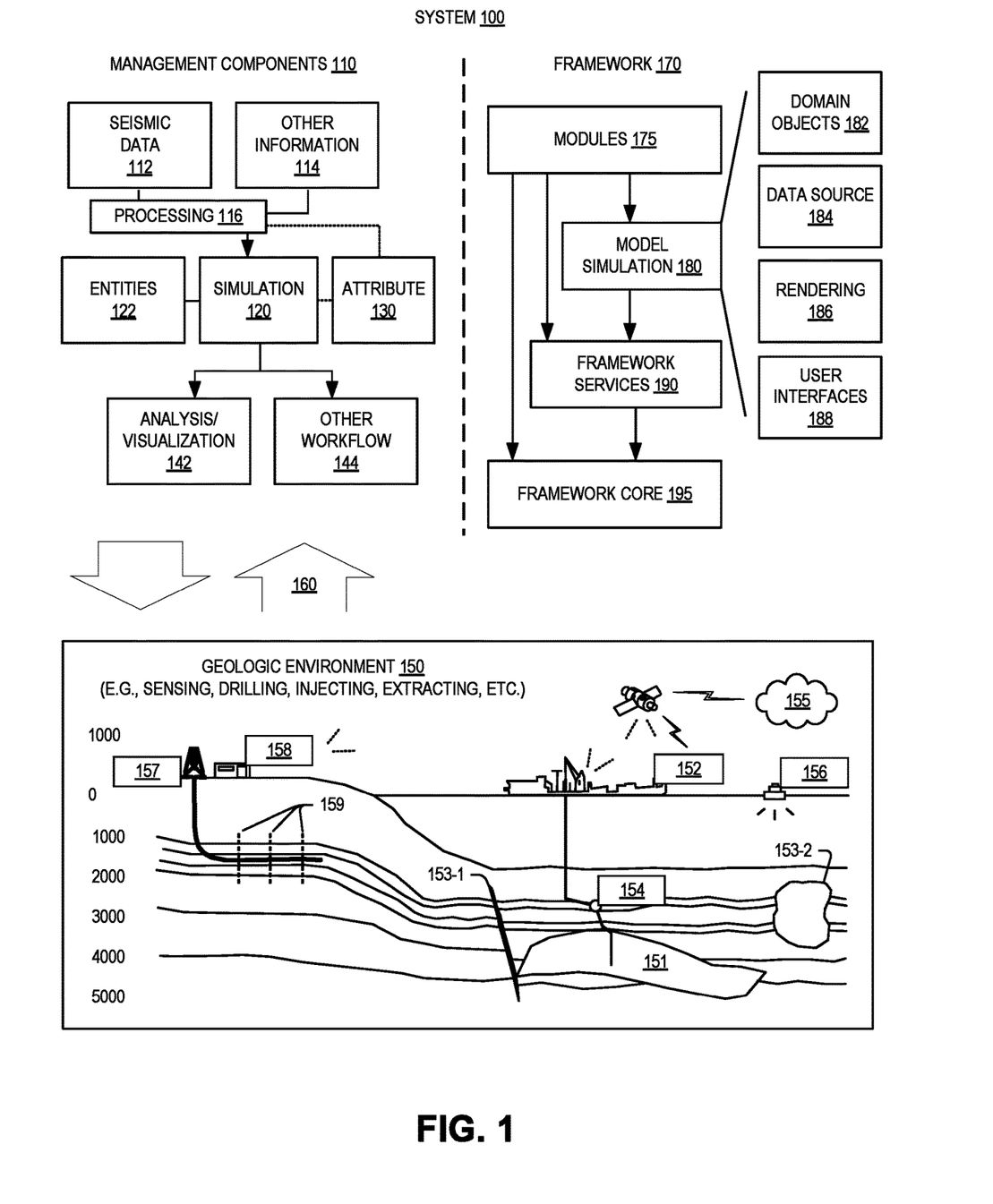
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
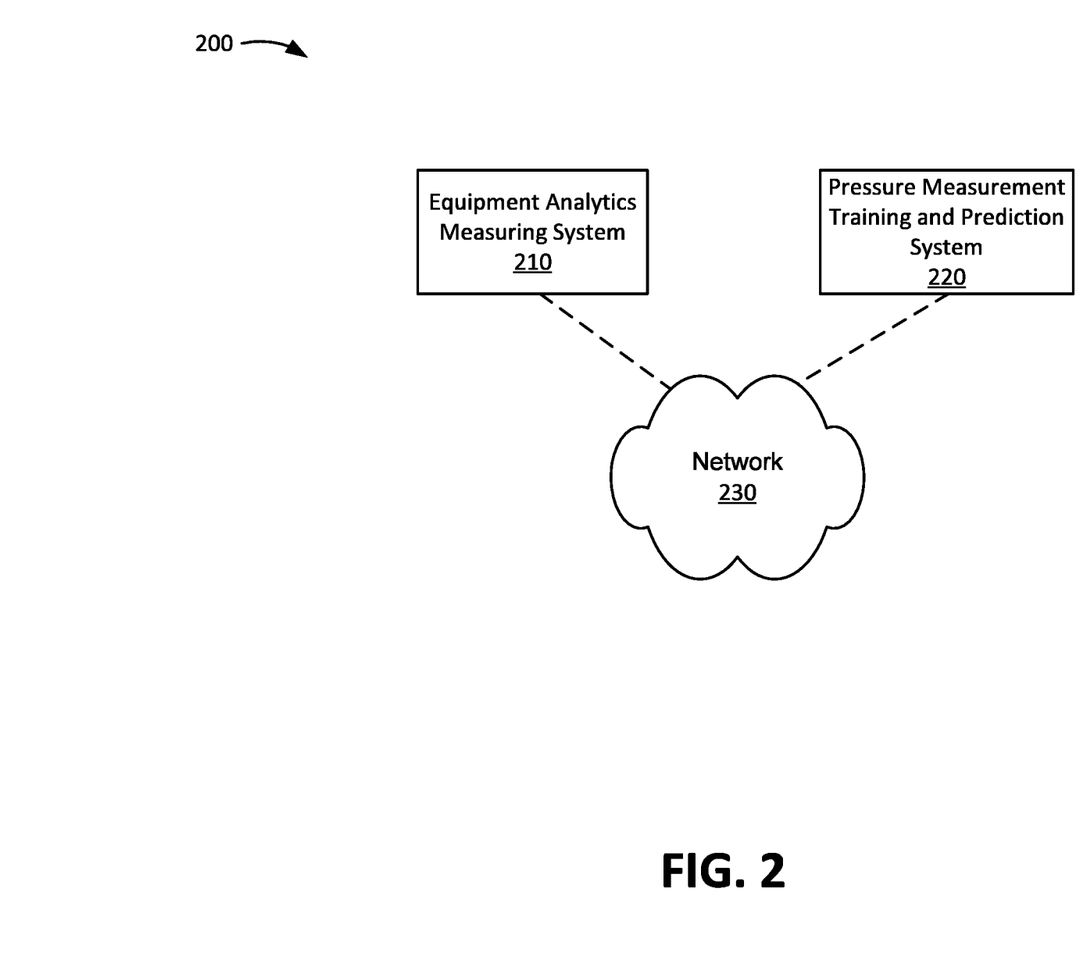
FIG. 2 illustrates an example machine learning and machine learning-based prediction environment in accordance with aspects of the present disclosure.

FIG. 2 illustrates an example machine learning and machine learning-based prediction environment in accordance with aspects of the present disclosure. As shown in FIG. 2, environment 200 includes an equipment analytics measuring system 210, a pressure measurement training and prediction system 220, and a network 230.

The equipment analytics measuring system 210 may include one or more computing devices that obtains, measures, receives, and/or transmits analytics data (e.g., sensor data) related to equipment in the geological environment 150 (e.g., the equipment 156/157, and/or other equipment). For example, the equipment analytics measuring system 210 may measure equipment pressure at various calibration points and may also measure analytics data at those pressure measurements (e.g., bit depth, flow rate, flow pressure, surface torque, weight on bit, etc.). In some embodiments, the equipment analytics measuring system 210 may acquire training analytics data during an experimental operation (e.g., to obtain training analytics data at the calibration points) and provide the training analytics data to the pressure measurement training and prediction system 220 (e.g., such that the pressure measurement training and prediction system 220 may train a machine learning system using the training analytics data). Additionally, or alternatively, the equipment analytics measuring system 210 may measure operational analytics data during a real-time operation and provide the operational analytics data to the pressure measurement training and prediction system 220 (e.g., such that the pressure measurement training and prediction system 220 may predict pressure based on the operational analytics data).

The pressure measurement training and prediction system 220 may include one or more computing devices that trains a machine learning system to predict pressure using a hybrid training approach based on a limited set of training data (e.g., training analytics data from the equipment analytics measuring system 210) and from supplemental training data (e.g., pressure estimates based on analytics data and derived from a physical model). In some embodiments, the pressure measurement training and prediction system 220 may train the machine learning system using any suitable machine learning technique (e.g., a Gaussian-based machine learning training operation, neural network training operation, or other type of machine learning training operation). As described herein, the limited training analytics data may include pressure measurement truths from and input analytics data associated with those truths (e.g., bit depth, flow rate, flow pressure, surface torque, weight on bit, etc.). In some embodiments, the pressure measurement training and prediction system 220 may receive operational analytics data and predict pressure measurements using the trained machine learning system.

In some embodiments, the pressure measurement training and prediction system 220 may store and/or output the pressure measurement predictions and/or uncertainty margins for display (e.g., on a graph, report, etc.). Additionally, or alternatively, the pressure measurement training and prediction system 220 may use the pressure measurement predictions to refine the machine learning system but may exclude abnormal or anomalous pressure measurement predictions from refining the machine learning system. As described herein, abnormal or anomalous pressure measurement predictions may trigger an alert to notify a user (e.g., equipment operator) that an anomalous pressure measurement has been detected (e.g., such that the equipment operator may take appropriate corrective action).

The network 230 may include network nodes and one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 230 may include copper transmission cables, optical transmission fibers, wireless transmission, routers, firewalls, switches, gateway computers and/or edge servers.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 3:
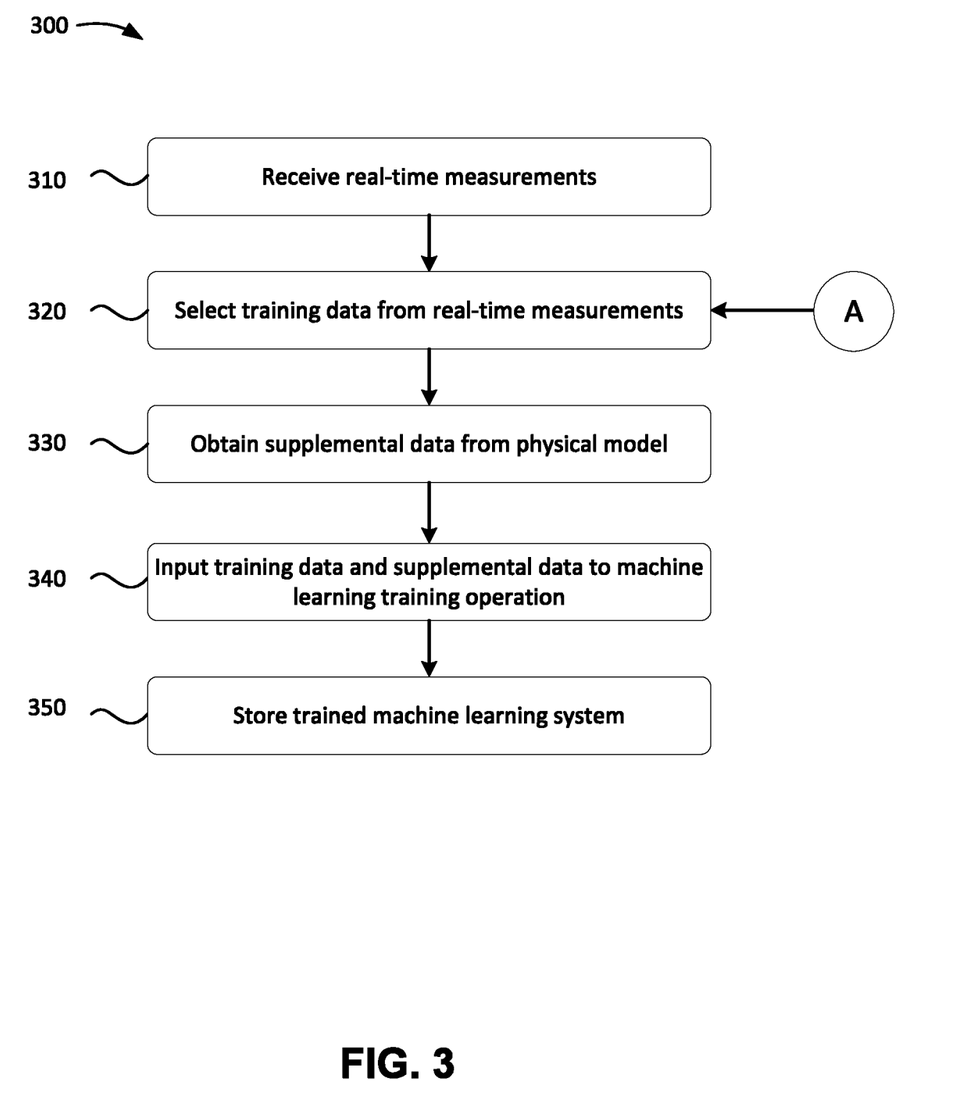
FIG. 3 illustrates an example flowchart of a process for training a machine learning system using a hybrid approach in accordance with aspects of the present disclosure.

FIG. 3 illustrates an example flowchart of a process for training a machine learning system using a hybrid approach in accordance with aspects of the present disclosure. The blocks of FIG. 3 may be implemented in the environment of FIG. 2, for example, and are described using reference numbers of elements depicted in FIG. 2. As noted herein, the flowchart illustrates the architecture, functionality, and operation of possible implementations of systems, methods, and computer program products according to various embodiments of the present disclosure.

As shown in FIG. 3, the process 300 may include receiving training data and truths (as at block 310). For example, the pressure measurement training and prediction system 220 may receive real-time measurements from the equipment analytics measuring system 210. In some embodiments, the real-time measurements may include analytics associated with the pump pressure measurements (e.g., bit depth, flow rate, flow pressure, surface torque, weight on bit, etc.). The real-time measurements may further include calculated pressure measurement truths. In some embodiments, the real-time measurements including the truths may be obtained as part of an experimental process and/or from a real-time operations.

The process 300 also may include selecting training data from the real-time measurements (as at block 320). For example, the pressure measurement training and prediction system 220 may select a subset of the real-time measurements to use as training data for training the machine learning system (or refining a previously trained machine learning system). During initial training of the machine learning system, all of the real-time measurements may be selected as training data (e.g., calibration points) in which the training data identifies pressure measurement truths, and analytics data (e.g., sensor data) at the pressure measurement truths. As described in greater detail herein, during refinement of a previously trained machine learning system, anomalous pressure readings may be discarded and not selected as training data used to refine the machine learning system.

The process 300 further may include obtaining supplemental data from a physical model (as at block 330). For example, the pressure measurement training and prediction system 220 may obtain supplemental data from a physical model by inputting a set of input analytics data into the physical model. As described herein, the physical model may produce estimates of pump pressures based on the set of input data (e.g., bit depth, flow rate, flow pressure, surface torque, weight on bit, etc.). More specifically, the supplemental data may map the input data to pressure estimate "truths." The supplemental data may include these estimates and may be used to train the machine learning system.

The process 300 also may include inputting the training data and the supplemental data to the machine learning system training operation (as at block 340). For example, the pressure measurement training and prediction system 220 may input the training data (e.g., from block 320) and the supplemental data (e.g., from block 330) into a machine learning system training operations, such as a Gaussian training operation. In general, the pressure measurement training and prediction system 220 may input the training data and the supplemental data into any suitable training process that maps the training and supplemental data to pressure measurement truths. In some embodiments, the training operation may also link a margin of error to the pressure measurement truths.

The process 300 further may include storing the trained machine learning system (as at block 350). For example, the pressure measurement training and prediction system 220 may store the trained machine learning system for use in predicting pressure measurements for a real-time operation. As described herein, the process 300 may be repeated to train different machine learning systems for different types of drilling operations. For example, one machine learning system may be trained for an "on-bottom" operation, and another may be trained for an "off-bottom" operation. Thus, the training data and supplemental data (e.g., from blocks 320 and 330) may be labeled with a type of operation. As, as described herein, different training operations may be applied (e.g., at block 340) based on the different types of drilling operations. In this way, the training data and supplemental data may be used to train and/or refine the correct machine learning system using the best-suited training operation.

Figure 4:
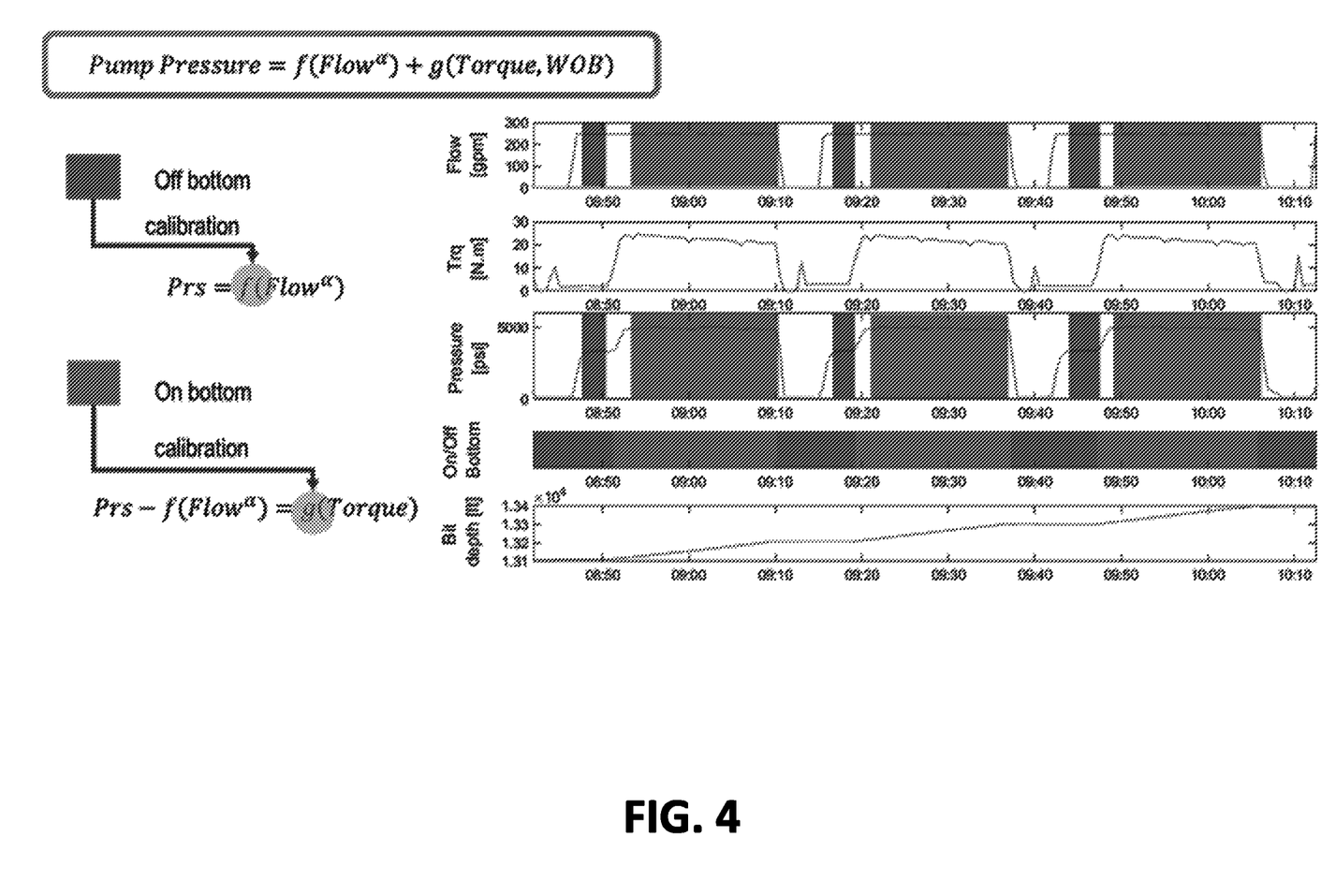
FIG. 4 illustrates an approach for identifying different types of operations for calibrating different machine learning systems.

FIG. 4 illustrates an approach for identifying different types of operations for calibrating different machine learning systems. As described herein, one machine learning system may be trained for an "on-bottom" operation, and another may be trained for an "off-bottom" operation. As shown in FIG. 4, input data may data may be obtained and graphed, and this data my be used to identify the different periods in which different operations are occurring (and hence, which machine learning system to train, and which machine learning system training operation to use). For example, during off-bottom situations, little to no pressure drop is present through the drilling equipment (e.g., a mud motor). Thus, the measured pump pressure may be equal to the pressure model dependent on pump flow. Accordingly, a pump flow dependent model or machine learning system may be trained during this period (e.g. at block 340 of FIG. 3). During the on-bottom situation, an extra pressure drop may be present through the drilling equipment (e.g., mud motor). To calibrate its related machine learning system model (e.g. at block 340 of FIG. 3), the measured pressure less the pressure drop dependent on the mud flow (calibrated during off bottom situation) may be used. In another type of drilling operations (e.g., during slide drilling operation), the pressure drop through the mud motor may be dependent on the weight on bit. In another type of drilling operation (e.g., rotary drilling operation), the pressure drop through the motor may be dependent on the torque at bit (or extensively to the surface torque).

Figure 5:
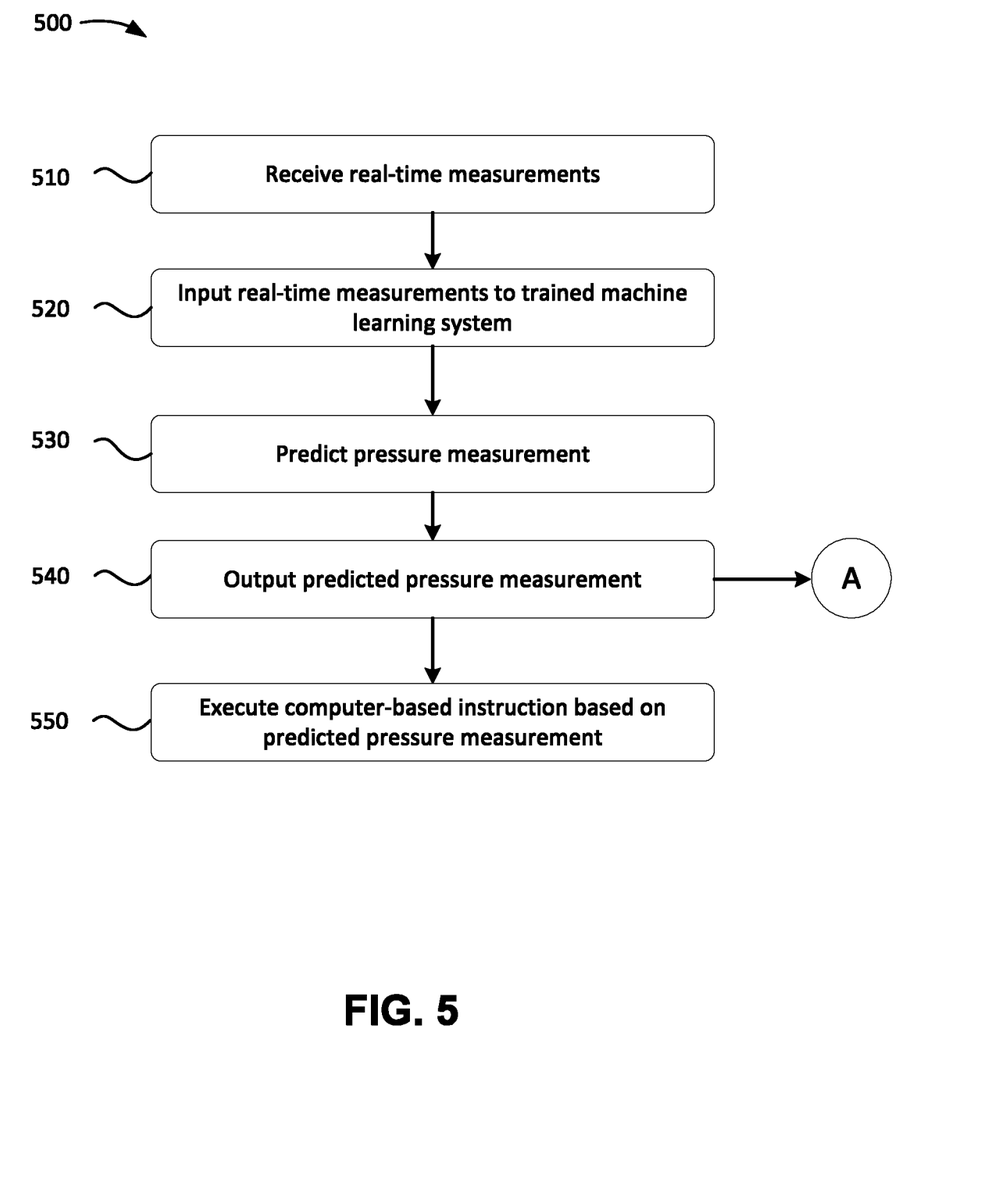
FIG. 5 illustrates an example flowchart of a process for predicting pressure measurements and uncertainty margins using a trained machine learning system in accordance with aspects of the present disclosure.

FIG. 5 illustrates an example flowchart of a process for predicting pressure measurements and uncertainty margins using a trained machine learning system in accordance with aspects of the present disclosure. The blocks of FIG. 5 may be implemented in the environment of FIG. 2, for example, and are described using reference numbers of elements depicted in FIG. 2. As noted herein, the flowchart illustrates the architecture, functionality, and operation of possible implementations of systems, methods, and computer program products according to various embodiments of the present disclosure.

As shown in FIG. 5, the process 500 may include receiving real-time measurements (as at block 510). For example, the pressure measurement training and prediction system 220 may receive real-time operational measurements (e.g., analytics data) related to a real-time drilling operation for drilling equipment from the equipment analytics measuring system 210. In some embodiments, the pressure measurement training and prediction system 220 may receive the real-time measurements from a live operation. As described herein, the real-time measurements may include any variety of data, such as bit depth, flow rate, flow pressure, surface torque, weight on bit, etc.

The process 500 also may include inputting the real-time measurements to a trained machine learning system (as at block 520). For example, the pressure measurement training and prediction system 220 may input the real-time measurements to a trained machine learning system (e.g., a machine learning system trained in accordance with the process 300 described above). As described herein, the pressure measurement training and prediction system 220 may input the real-time measurements to the trained machine learning system to predict a pressure measurement (e.g., pump pressure measurement) and uncertainty. For example, the trained machine learning system may map a pressure measurement truth or prediction and uncertainty margin to the real-time measurements (e.g., received at block 510). In some embodiments, the pressure measurement training and prediction system 220 may select a particular one of multiple different trained machine learning systems for predicting the pressure measurement. For example, the pressure measurement training and prediction system 220 may select a trained machine learning system based on the operation associated with the real-time measurement (e.g., an off-bottom or on-bottom drilling operation).

The process 500 further may include predicting the pressure measurement (as at block 530). For example, the pressure measurement training and prediction system 220 may predict a real-time equipment pressure measurement based on inputting the real-time operational measurements to the trained machine learning system. Specifically, the pressure measurement training and prediction system 220 the machine learning system may return a pressure measurement prediction based on the real-time measurements inputted to the machine learning system (e.g., at block 520).

The process 500 also may include outputting the predicted pressure measurement (as at block 540). For example, the pressure measurement training and prediction system 220 may output the predicted pressure measurement to an application for storage and/or display. In some embodiments, the predicted pressure measurement may be plotted on a graph or chart. In some embodiments, multiple previously predicted pressure measurements may also be plotted.

In some embodiments, the predicted pressure measurement may be used to refine the trained machine learning system. For example, the predicted pressure measurement may be selected as training data (e.g., as at block 320 of process 300 in FIG. 3). As described in greater detail herein, a predicted pressure measurement within an uncertainty margin may be selected as training data for refinement (e.g., recalibration) of the trained machine learning system.

The process 500 further may include executing a computer-based instruction based on the predicted pressure measurement (as at block 550). For example, the pressure measurement training and prediction system 220 may execute a computer-based instruction based on the predicted pressure measurement. In some embodiments, the computer-based instruction may include an instruction to display the pressure measurement, store the pressure measurement, refine the trained machine learning system based on the pressure measurement, output an alert (e.g., when the pressure measurement is outside of a threshold), adjust the operation of equipment (e.g., drilling equipment), etc. Additionally, or alternatively, the computer-based instruction may include any other instruction that uses the predicted pressure measurement.

Figure 6:
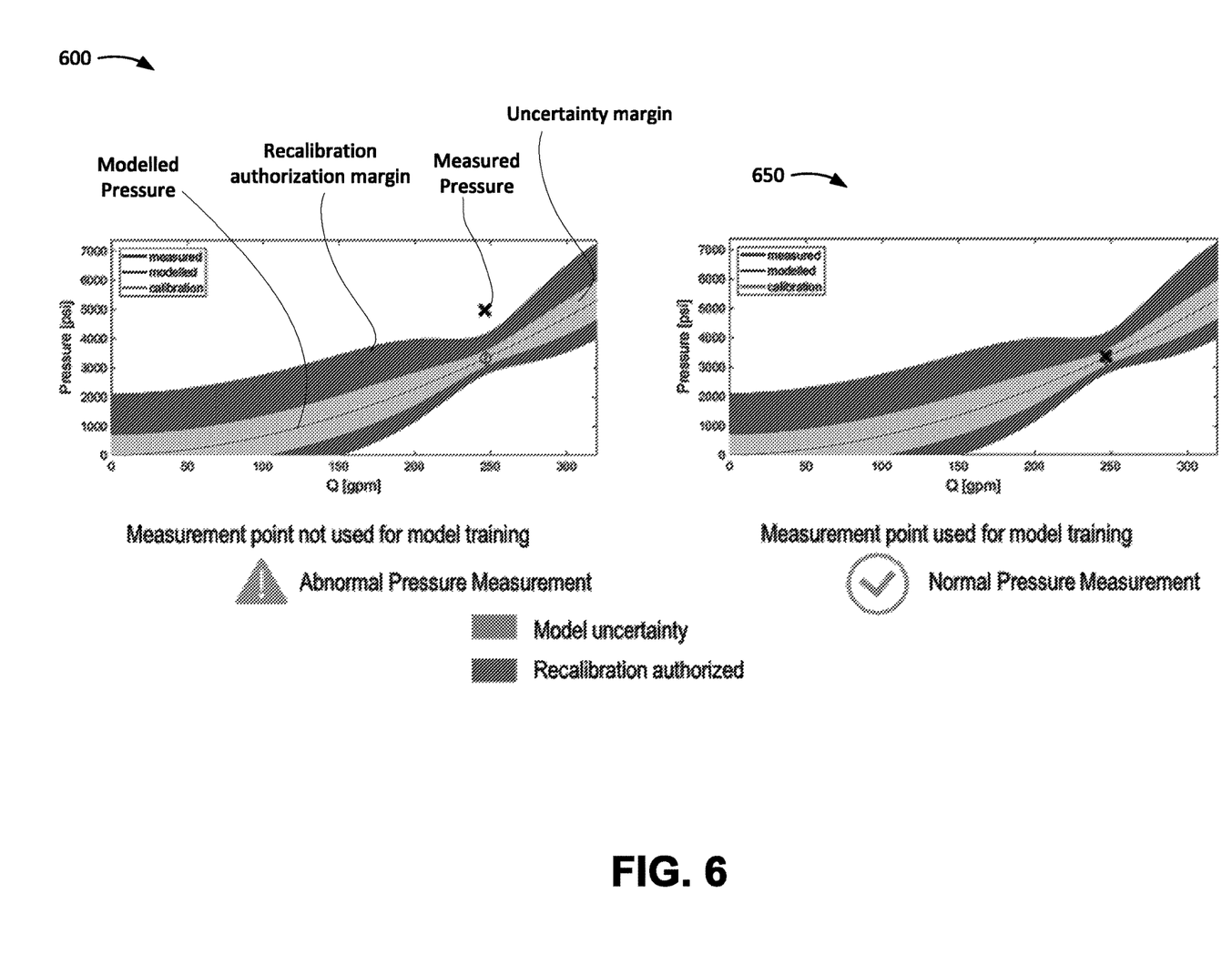
FIG. 6 illustrates a visual representation of identifying abnormal and normal pressure measurements based on a trained machine learning system model.

FIG. 6 illustrates a visual representation of identifying abnormal and normal pressure measurements based on a trained machine learning system model. As shown in graph 600 of FIG. 6, the model may include a regression line of modeled pressure at different flow rates, Q (in gallons per minute, or gpm) according to a trained machine learning system. In some embodiments, the model may illustrate uncertainty and recalibration authorization margins. The uncertainty margins may represent a margin of error of the modeled pressure at various flow rates.

In some embodiments, the recalibration authorization margin may represent a threshold at which a measured pressure may be used to automatically recalibrate or refine the trained machine learning system. For example, referring to the graph 600, the measured pressure is outside of the authorized recalibration margin and considered an abnormal or anomalous pressure. In this situation, the measured pressure is not used to refine the trained machine learning system, as this may incorrectly skew the model regression. By incorporating the recalibration authorization margin, the recalibration of the machine learning system's prediction model may be made automatic or semi-automatic in which anomalous pressure measurements are automatically omitted or ignored for the purposes of recalibration. In some embodiments, the abnormal or anomalous pressure measurement may be reported or may trigger an alert to notify a user (e.g., equipment operator) that an abnormal pressure has been detected. In this way, the abnormal pressure may be detected reported, but not used to refine or recalibrate the trained model. On the other hand, and referring to the graph 650, if the pressure measurement is within the authorized recalibration margin, the pressure measurement may be used to recalibrate and/or refine the trained model.

Figure 7:
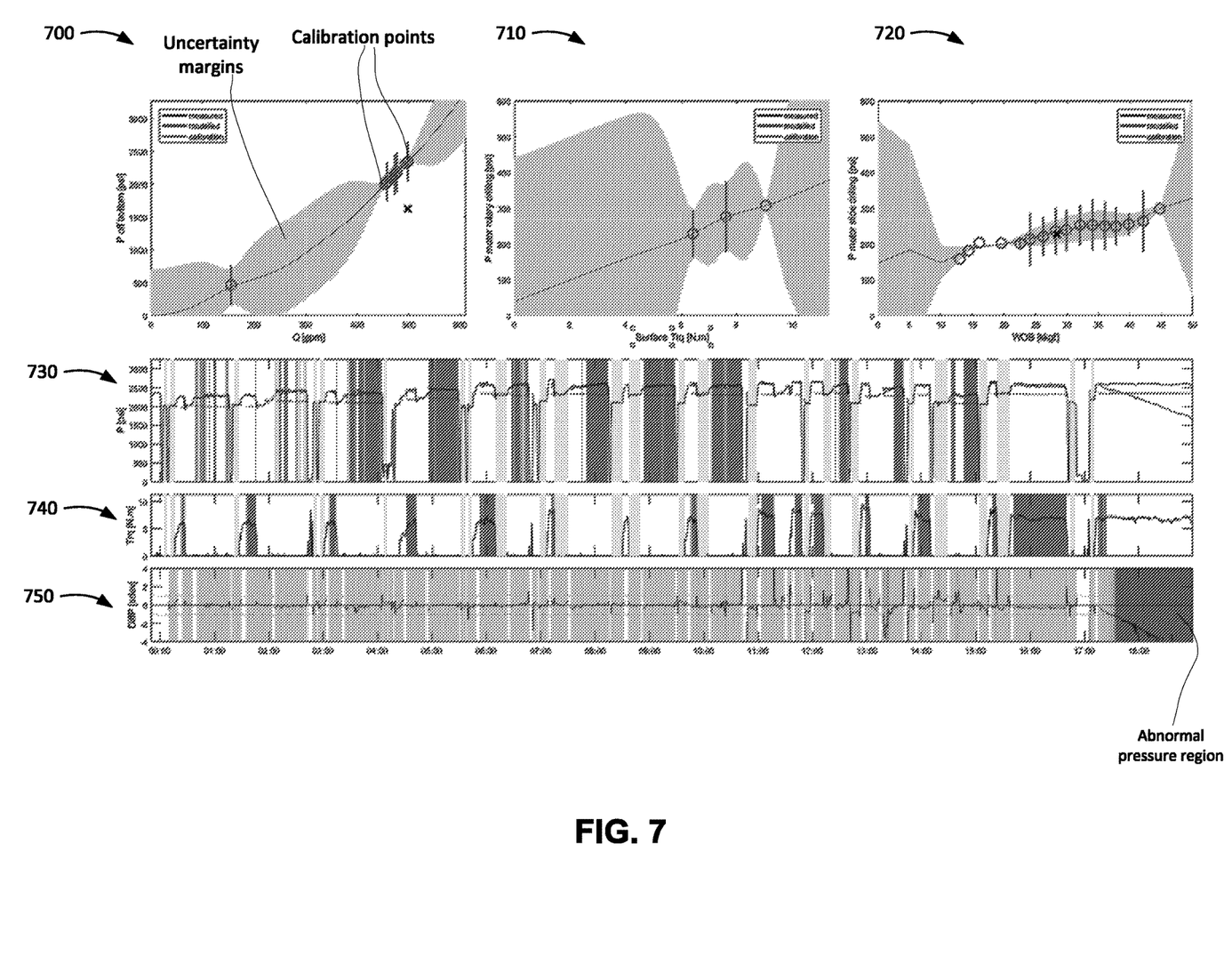
FIG. 7 illustrates example graphs of equipment pressure models generated using the machine learning system training process described herein, and illustrations of normal and abnormal pressure regions by drilling operation type.

FIG. 7 illustrates example graphs of equipment pressure models generated using the machine learning system training process described herein, and illustrations of normal and abnormal pressure regions by drilling operation type. The graph 700 models pressure measurements based on flow for the "off-bottom" drilling operation type. The graph 700 also includes uncertainty margins for the modeled pressure measurements. As shown in the graph 700, the uncertainty margins may be relatively smaller at or near the calibration points (e.g., since the calibration points represent actual measured pressure measurements, whereas other points on the model may be estimates derived from the physical model). The graph 710 illustrates a model in a similar format as the graph 700, but for a different type of drilling operation (e.g., the motor rotary drilling operation). Similarly, the graph 700 illustrates a model in a similar format as the graph 700, but for the motor slide drilling operation.

The graph 730 shows pressure measurements over time and for different operation types, represented by different shadings. The pressure measurements shown in the graph 730 may be obtained using the train machine learning system as described herein. The graph 740 may illustrate torque measurements, and the graph 750 may illustrate pressure standard deviations. As shown towards the end of the graph 750, abnormal pressure measurements may be presented in a time region having a different color or shading. In the example shown, abnormal pressure measurements were detected at approximately 17:30. In this way, abnormal pressure measurements may be visually represented in a manner that is quickly and easily identifiable to a user. In some embodiments, any of the graphs and illustrations shown in FIG. 7 may be presented to a user within an application.

Figure 8:
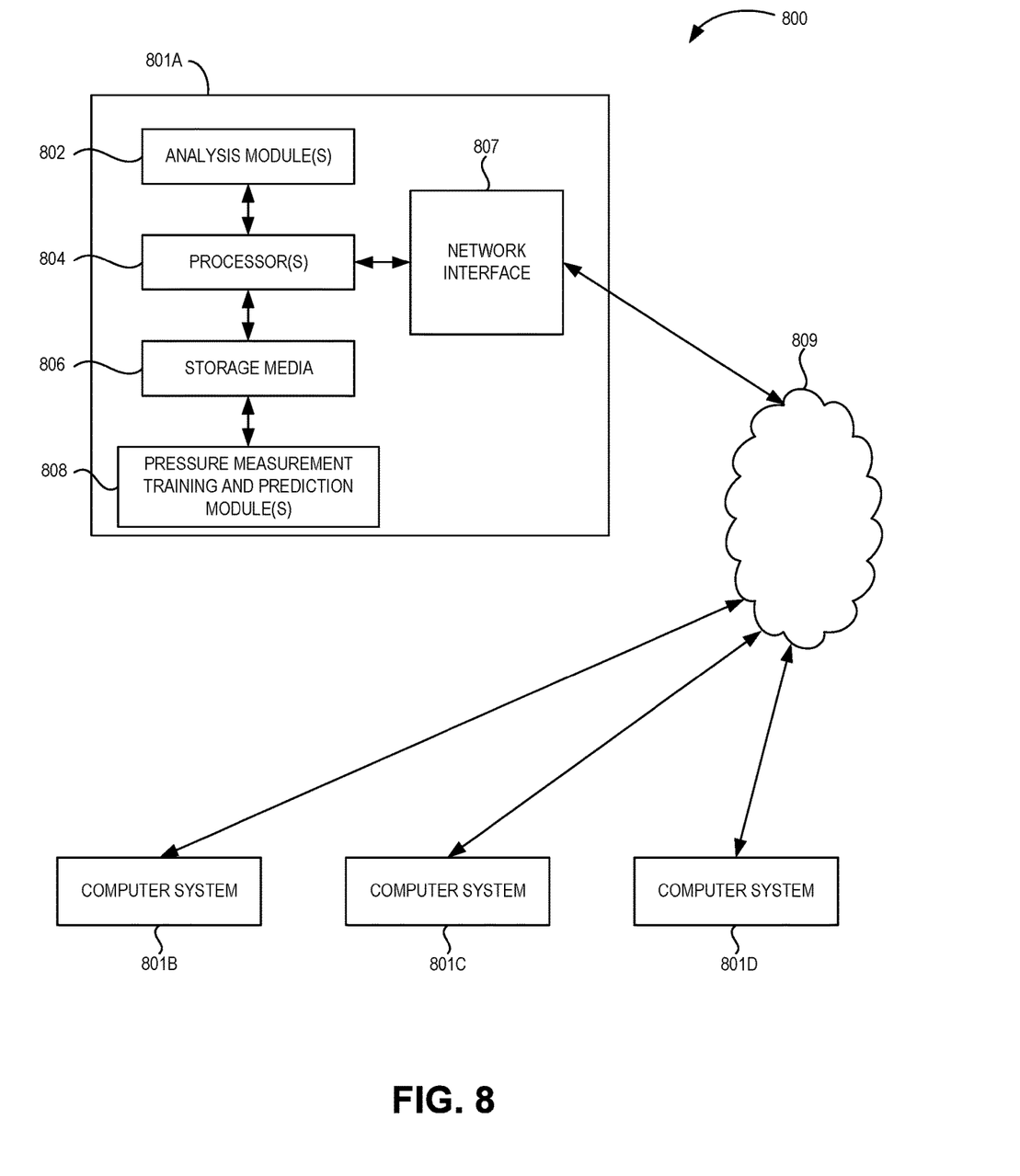
FIG. 8 illustrates a schematic view of a computing system, according to an embodiment.

In some embodiments, the methods of the present disclosure may be executed by a computing system. FIG. 8 illustrates an example of such a computing system 800, in accordance with some embodiments. The computing system 800 may include a computer or computer system 801A, which may be an individual computer system 801A or an arrangement of distributed computer systems. The computer system 801A includes one or more analysis modules 802 that are configured to perform various tasks according to some embodiments, such as one or more methods disclosed herein. To perform these various tasks, the analysis module 602 executes independently, or in coordination with, one or more processors 804, which is (or are) connected to one or more storage media 806. The processor(s) 804 is (or are) also connected to a network interface 807 to allow the computer system 801A to communicate over a data network 809 with one or more additional computer systems and/or computing systems, such as 801B, 801C, and/or 801D (note that computer systems 801B, 801C and/or 801D may or may not share the same architecture as computer system 801A, and may be located in different physical locations, e.g., computer systems 801A and 801B may be located in a processing facility, while in communication with one or more computer systems such as 801C and/or 801D that are located in one or more data centers, and/or located in varying countries on different continents).

A processor may include a microprocessor, microcontroller, processor module or subsystem, programmable integrated circuit, programmable gate array, or another control or computing device.

The storage media 806 may be implemented as one or more computer-readable or machine-readable storage media. Note that while in the example embodiment of FIG. 8 storage media 806 is depicted as within computer system 801A, in some embodiments, storage media 806 may be distributed within and/or across multiple internal and/or external enclosures of computing system 801A and/or additional computing systems. Storage media 806 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 800 contains one or more pressure measurement training and prediction module(s) 808. In the example of computing system 800, computer system 801A includes the pressure measurement training and prediction module 808. In some embodiments, a single pressure measurement training and prediction module 808 may be used to perform some aspects of one or more embodiments of the methods disclosed herein. In other embodiments, a plurality of pressure measurement training and prediction modules 808 may be used to perform some aspects of methods herein.

It should be appreciated that computing system 800 is merely one example of a computing system, and that computing system 800 may have more or fewer components than shown, may combine additional components not depicted in the example embodiment of FIG. 8, and/or computing system 800 may have a different configuration or arrangement of the components depicted in FIG. 8. The various components shown in FIG. 8 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 800, FIG. 8), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to explain the principles of the disclosure and its practical applications, to thereby enable others skilled in the art to best utilize the disclosed embodiments and various embodiments with various modifications as are suited to the particular use contemplated.

What is claimed is:

1. A method for training and using a machine learning system to predict equipment pressure measurements, comprising:
inputting a set of training data including a first set of equipment pressure measurements;
inputting a set of supplemental data, wherein the supplemental data is obtained from a physical model that estimates a second set of equipment pressure measurements;
training the machine learning system based on the set of training data and the set of supplemental data to generate a trained machine learning system, wherein the machine learning system is a first machine learning system associated with a first type of equipment operation, and wherein the first type of equipment operation is an off-bottom operation;
training a second machine learning system associated with a second type of equipment operation, wherein the second type of equipment operation is an on-bottom operation;
receiving real-time operational data;
inputting the real-time operational data into the trained machine learning system;
predicting a real-time equipment pressure measurement based on the inputting the real-time operational data into the trained machine learning system; and executing a computer-based instruction based on the predicting the real-time equipment pressure measurement.

2. The method of claim 1, wherein the supplemental data is not historical or experimental data and includes estimates of the second set of equipment pressure measurements.

3. The method of claim 1, wherein the computer-based instruction includes at least one selected from the group consisting of:
an instruction to display the real-time equipment pressure measurement;
an instruction to store the real-time equipment pressure measurement;
an instruction to refine the trained machine learning system based on the real-time equipment pressure measurement;
an instruction to output an alert when the real-time equipment pressure measurement is outside of a threshold; and
an instruction to adjust the operation of equipment.

4. The method of claim 1, further comprising:
determining that the real-time equipment pressure measurement is within a recalibration authorization margin; and
refining the machine learning system using the real-time equipment pressure measurement in response to determining that the real-time equipment pressure measurement is within the recalibration authorization margin.

5. The method of claim 1, wherein training the machine learning model comprises applying a Gaussian-based machine learning training operation.

6. The method of claim 1, wherein the training the machine learning system includes determining uncertainty margins associated with equipment pressure measurement predictions.

7. A computing system, comprising:
one or more processors; and
a memory system comprising one or more non-transitory computer-readable media storing instructions that, when executed by at least one of the one or more processors, cause the computing system to perform operations, the operations comprising:
inputting a set of training data including a first set of equipment pressure measurements;
inputting a set of supplemental data, wherein the supplemental data is obtained from a physical model that estimates a second set of equipment pressure measurements;
training a machine learning system based on the set of training data and the set of supplemental data to generate a trained machine learning system, wherein the machine learning system is a first machine learning system associated with a first type of equipment operation, and wherein the first type of equipment operation is an off-bottom operation;
training a second machine learning system associated with a second type of equipment operation, wherein the second type of equipment operation is an on-bottom operation;
receiving real-time operational data;
inputting the real-time operational data into the trained machine learning system;
predicting a real-time equipment pressure measurement based on the inputting the real-time operational data into the trained machine learning system; and
executing a computer-based instruction based on the predicting the real-time equipment pressure measurement.

8. The computing system of claim 7, wherein the supplemental data is not historical or experimental data and includes estimates of the second set of equipment pressure measurements.

9. The computing system of claim 7, wherein the computer-based instruction include at least one selected from the group consisting of:
an instruction to display the real-time equipment pressure measurement;
an instruction to store the real-time equipment pressure measurement;
an instruction to refine the trained machine learning system based on the real-time equipment pressure measurement;
an instruction to output an alert when the real-time equipment pressure measurement is outside of a threshold; and
an instruction to adjust the operation of equipment.

10. The computing system of claim 7, wherein the operations further comprise:
determining that the real-time equipment pressure measurement is within a recalibration authorization margin; and
refining the machine learning system using the real-time equipment pressure measurement in response to determining that the real-time equipment pressure measurement is within the recalibration authorization margin.

11. The computing system of claim 7, wherein training the machine learning model comprises applying a Gaussian-based machine learning training operation.

12. The computing system of claim 7, wherein the training the machine learning system includes determining uncertainty margins associated with equipment pressure measurement predictions.

13. A non-transitory computer-readable medium storing instructions that, when executed by one or more processors of a computing system, cause the computing system to perform operations, the operations comprising:
inputting a set of training data including a first set of equipment pressure measurements;
inputting a set of supplemental data, wherein the supplemental data is obtained from a physical model that estimates a second set of equipment pressure measurements;
training a machine learning system based on the set of training data and the set of supplemental data to generate a trained machine learning system, wherein the machine learning system is a first machine learning system associated with a first type of equipment operation, and wherein the first type of equipment operation is an off-bottom operation;
training a second machine learning system associated with a second type of equipment operation, wherein the second type of equipment operation is an on-bottom operation;
receiving real-time operational data;
inputting the real-time operational data into the trained machine learning system;
predicting a real-time equipment pressure measurement based on the inputting the real-time operational data into the trained machine learning system; and
executing a computer-based instruction based on the predicting the real-time equipment pressure measurement.

14. The computer-readable medium of claim 13, wherein the supplemental data is not historical or experimental data and includes estimates of the second set of equipment pressure measurements.

15. The computer-readable medium of claim 13, wherein the computer-based instruction include at least one selected from the group consisting of:
- an instruction to display the real-time equipment pressure measurement;
- an instruction to store the real-time equipment pressure measurement;
- an instruction to refine the trained machine learning system based on the real-time equipment pressure measurement;
- an instruction to output an alert when the real-time equipment pressure measurement is outside of a threshold; and
- an instruction to adjust the operation of equipment.

16. The computer-readable medium of claim 13, wherein the operations further comprise:
- determining that the real-time equipment pressure measurement is within a recalibration authorization margin; and
- refining the machine learning system using the real-time equipment pressure measurement in response to determining that the real-time equipment pressure measurement is within the recalibration authorization margin.

17. The computer-readable medium of claim 13, wherein training the machine learning model comprises applying a Gaussian-based machine learning training operation.

* * * * *